US006610979B2

(12) United States Patent
Harada

(10) Patent No.: US 6,610,979 B2
(45) Date of Patent: Aug. 26, 2003

(54) QUADRUPOLE MASS SPECTROMETER

(75) Inventor: Shigetoshi Harada, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 196 days.

(21) Appl. No.: 09/901,042

(22) Filed: Jul. 10, 2001

(65) Prior Publication Data

US 2002/0005480 A1 Jan. 17, 2002

(30) Foreign Application Priority Data

Jul. 13, 2000 (JP) ....................................... 2000-212238

(51) Int. Cl.[7] ................................................ B01D 59/44
(52) U.S. Cl. ....................................................... 250/292
(58) Field of Search ................................ 250/292, 282, 250/288, 281

(56) References Cited

U.S. PATENT DOCUMENTS 4,214,160 A * 7/1980 Fies et al. .................... 250/292
5,422,482 A * 6/1995 Nakajima et al. ........... 250/290
5,464,975 A * 11/1995 Kirchner et al. ............ 250/283
6,153,880 A * 11/2000 Russ et al. .................. 250/292
2001/0009266 A1 * 7/2001 Harada ....................... 250/286

* cited by examiner

*Primary Examiner*—Judy Nguyen
(74) *Attorney, Agent, or Firm*—Armstrong, Westerman & Hattori, LLP

(57) ABSTRACT

The quadrupole mass spectrometer according to the present invention includes an ion source; a quadrupole filter including four rod electrodes for allowing ions having a preset mass number (mass/charge) among those ions generated by the ion source to pass through the space surrounded by the four rod electrodes; an ion detector for detecting the ions passing through the space; a quadrupole driver for applying a DC+RF voltage to the four rod electrodes, where the voltage corresponds to the preset mass number; a scanning controller for changing the voltage applied to the four rod electrodes to scan through a preset scanning range of the mass number; and a field controller for producing an electrical field between the ion source and the quadrupole filter, where the magnitude of the electrical field depends on the scanning speed of the scanning controller. The magnitude of the electrical field is controlled so that the kinetic energy of the ions entering the quadrupole filter becomes larger if the scanning speed is larger. Owing to this, the ions entering the quadrupole filter are given a larger kinetic energy so that they pass through the quadrupole filter in a shorter time. The smaller the passing time is, the change in the voltage applied to the rod electrodes while the ions are passing through is smaller. This decreases the possibility of proper ions that should pass through the quadrupole filter and should enter the ion detector to dissipate in the course of passage through the quadrupole filter due to the voltage change while passage. Thus a larger number of ions can pass through the quadrupole and the sensitivity of measurement is improved.

7 Claims, 2 Drawing Sheets

QUADRUPOLE MASS SPECTROMETER

BACKGROUND OF THE INVENTION

A conventional quadrupole mass spectrometer is illustrated in FIG. 3A, in which molecules or atoms of a sample are ionized in the ion source 1 and the ions are introduced into the quadrupole filter 3. Ions of a certain mass number (=[mass]/[electrical charge]) selectively can pass through the quadrupole filter 3, and enter the ion detector 4. Since the mass number of ions passing through the quadrupole filter 3 depends on the voltage applied to the quadrupole filter 3, measurement of a predetermined mass range can be performed by changing (scanning) the applied voltage in a specific range. This is the scan-measurement of a quadrupole mass spectrometer.

For example, in a gas-chromatograph mass spectrometer (GC/MS) or liquid-chromatograph mass spectrometer (LC/MS), components of the sample are separated in a course of time by the gas-chromatograph or liquid-chromatograph, while the scan-measurement is continuously repeated at high speed, so that every separated component is scan-measured and the mass spectrographs of the components are obtained. Examples of the voltage scanning patterns are shown in FIG. 3B. In a scan-measurement, it is obvious that the larger the scanning speed is, the shorter the measurement time of a scanning cycle is, and the larger the number of scanning cycles within a predetermined time period is. This means that, in a GC/MS or LC/MS, higher time resolution can be obtained by increasing the scanning speed.

However, a large scanning speed has the following drawback. Supposing that an ion takes the time $t_1$ to pass through the length L of the quadrupole filter 3 as shown in FIGS. 3A and 3B, the time $t_1$ depends on the kinetic energy of the ion when the ion enters the quadrupole filter 3. Because the voltage applied to the quadrupole filter 3 is being scanned, the voltage is changing while the ion is passing through the quadrupole filter 3. This means that the change in the applied voltage while the ion is in the quadrupole filter 3 is larger as the voltage scanning speed is larger.

If the scanning cycle time is very long compared to the time (passing time) needed for the ion to pass through the quadrupole filter 3, the change in the voltage $\Delta V$ while the ion is passing is negligible, and there is no substantial problem. If, however, the voltage change $\Delta V$ is not negligible, some ions that could have otherwise passed through the quadrupole filter 3 cannot pass, and the number of ions reaching the ion detector 4 is less than it should be. This means that the sensitivity of measurement deteriorates as the scanning speed is increased.

SUMMARY OF THE INVENTION

The present invention is achieved in this respect. An object of the present invention is therefore to provide a quadrupole mass spectrometer that suffers no sensitivity deterioration when the scanning speed is increased.

Thus the quadrupole mass spectrometer according to the present invention includes:

an ion source;

a quadrupole filter including four rod electrodes for allowing ions having a preset mass number among ions generated by the ion source to pass through a space surrounded by the four rod electrodes;

an ion detector for detecting the ions passing through the space;

a quadrupole driver for applying a set of voltages to the four rod electrodes, where the set of voltages corresponds to the preset mass number;

a scanning controller for changing the set of voltages applied to the four rod electrodes to scan through a scanning range of the mass number; and a field controller for producing an electrical field between the ion source and the quadrupole filter, where the magnitude of the electrical field depends on the scanning speed of the scanning controller.

The electrical field can control the kinetic energy of the ions from the ion source when they enter the quadrupole filter. In the present invention, the magnitude of the electrical field is controlled so that the kinetic energy of the ions entering the quadrupole filter becomes larger if the scanning speed is larger. When, for example, positive ions are generated in the ion source of a quadrupole mass spectrometer and the ion source box is grounded, a negative DC bias voltage is applied to the rod electrodes of the quadrupole filter. It should be noted here that the bias DC voltage is different from the DC voltage applied to the rod electrodes of the quadrupole filter in order to filter, or select, passing ions. Owing to the DC bias voltage, the ions entering the quadrupole filter are given a larger kinetic energy so that they pass through the quadrupole filter in a shorter time. The smaller the passing time is, the change in the voltage applied to the rod electrodes while the ions are passing is smaller. This decreases the possibility of proper ions that should pass through the quadrupole filter and should enter the ion detector dissipating in the course of the passage through the quadrupole filter due to the voltage change during the passage. Thus a larger number of ions can pass through the quadrupole filter in the quadrupole mass spectrometer of the present invention, so that the sensitivity of measurement is improved.

BRIEF DESCRIPTION OF THE ATTACHED DRAWINGS

DETAILED DESCRIPTION OF A PREFERRED EMBODIMENT

Figure 1:
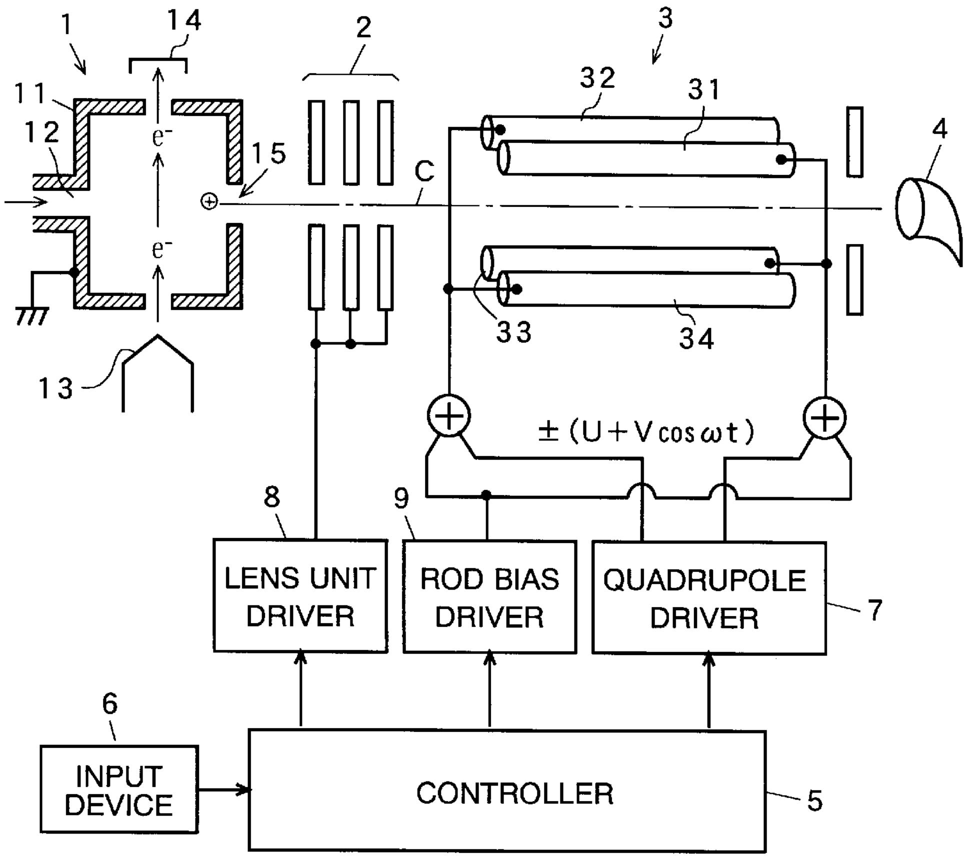
FIG. 1 is a side view and a block diagram illustrating the quadrupole mass spectrometer embodying the present invention.
Figure 2:
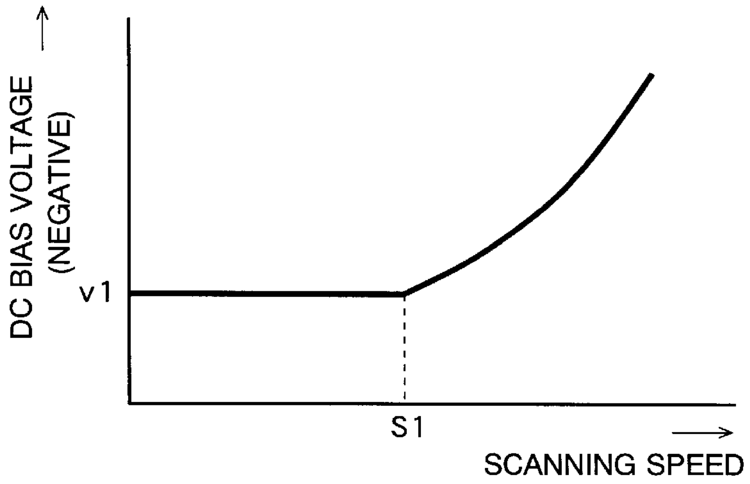
FIG. 2 is a graph of the bias voltage against the scanning speed effected in the embodiment.

A quadrupole mass spectrometer embodying the present invention is shown in FIGS. 1 and 2. In FIG. 1, an ion source 1, an ion lens unit 2, a quadrupole filter 3 and an ion detector 4 are aligned on a straight line C, which is referred to as the ion optical axis. In the ion source 1, an ion source box 11 with a sample inlet 12, a heat electron filament 13 and a trap electrode 14 are provided. Though the ion source 1 shown in FIG. 1 is specifically an electron impact type, other types such as a chemical ionizing type may be used. The ion lens unit 2 is applied with a DC (direct current) voltage by the lens unit driver 8. The four rod electrodes 31–34 of the quadrupole filter 3 are applied with a set of voltages by the quadrupole driver 7, which will be described later. The four rod electrodes 31–34 are also applied a DC bias voltage by the rod bias driver 9. The DC bias voltage is applied to the four rod electrodes 31–34 to endow a DC voltage difference between the ion source box 11 and the rod electrodes 31–34, and to produce an electrical field between them. The lens unit driver 8, the quadrupole driver 7 and the rod bias driver 9 are connected to and controlled by the controller 5, which is a computer including a CPU, memory and other peripheral devices. The controller 5 is also connected to an input device 6 from which commands and parameters necessary to execute a mass analysis are sent to the controller 5 according to the operator's operation.

The operation of the above quadrupole mass spectrometer is as follows. The filament 13 is joule heated and heat electrons are generated by the heated filament 13. The heat electrons are attracted by the trap electrode 14 which is placed at the other end of the ion source box 11 and is applied with an appropriate voltage. The heat electrons enter the ion source box 11 and are accelerated by the voltage difference between the filament 13 and the trap electrode 14. When molecules of a gas sample are introduced into the ion source box 11 through the sample inlet 12, the accelerated heat electrons collide with the sample molecules. As a result of this, an electron or electrons are driven out of the molecules, and the molecules are ionized (positive ions in the case of FIG. 1).

The ion source box 11 is grounded, and the ion lens unit 2 is applied a DC voltage having the polarity opposite to that of the ions. Thus the ions generated in the ion source box 11 are drawn out of the ion source box 11 and are accelerated by the electric field produced by the voltage difference between the inside of the ion source box 11 and the ion lens unit 2 (or the quadrupole filter 3). The ions are converged and further accelerated by the ion lens unit 2 so that they are introduced into the space surrounded by the four rod electrodes 31–34 of the quadrupole filter 3. The quadrupole driver 7 includes a DC (direct current) voltage source and an RF (radio frequency) voltage source. The DC voltage source generates two DC voltages ±U having the same magnitude and opposite polarities. The RF voltage source generates two RF voltages$\pm V\cdot\cos(\Omega\cdot t)$ having phases 180° shifted from each other. The DC voltages and the RF voltages are superposed and the resultant set of voltages$\pm(U\pm V\cdot\cos(\Omega\cdot t))$ are applied on the four rod electrodes 31–34. It is arranged in the quadrupole filter 3 that neighboring rods are applied voltages having phases 180° shifted from each other. Also on the four rod electrodes 31–34 are applied the same bias voltage from the rod bias driver 9. The values of U, V and the bias voltage are determined by the controller 5.

When the ions enter the quadrupole filter 3, the ions have the kinetic energy corresponding to the bias voltage applied by the rod bias driver 9. In the space surrounded by the four rod electrodes 31–34 of the quadrupole filter 3, the ions oscillate due to the electric field produced by the set of voltages applied to the four rod electrodes 31–34, and only such ions having a certain mass number (target mass number) corresponding to the values of U and V can pass through the quadrupole filter 3. Other ions dissipate through the oscillation from the space of the quadrupole filter 3 and cannot reach the ion detector 4. Thus the ion detector 4 receives only the ions having the target mass number and an electrical current corresponding to the number of ions is produced in the ion detector 4.

A characteristic operation of the quadrupole mass spectrometer of the present embodiment is as follows. The operator sets parameters such as the mass range of the analysis, the scanning speed (or the scanning cycle time), etc. necessary to perform a mass analysis of a sample on the input device 6.

Figure 3A:
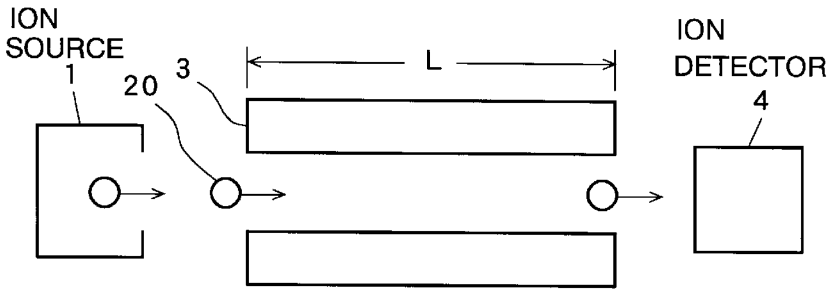
FIG. 3A illustrates a general quadrupole mass spectrometer and FIG. 3B is a graph of the voltage change while scanning at various speeds.
Figure 3B:
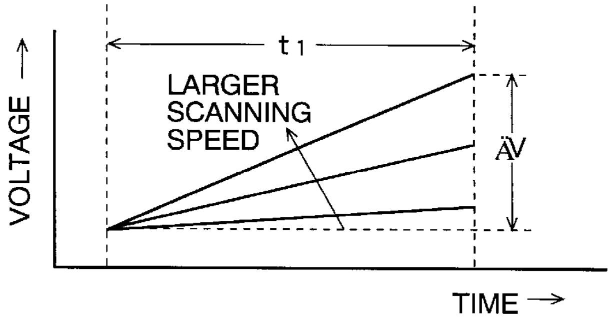

Based on the set scanning speed, the controller 5 determines the rod bias voltage as shown in FIG. 2. In the case of FIG. 2, the rod bias voltage is set at a fixed value $v_1$ when the scanning speed is lower than a value $S_1$. When the scanning speed is greater than $S_1$, the rod bias voltage is increased according to the right-hand side curve of FIG. 2 as the scanning speed is increased. As the rod bias voltage increases, the voltage difference between the ion source 1 and the quadrupole filter 3 increases, and the kinetic energy of the ions entering the quadrupole filter 3 increases. Since the traveling speed of the ions in the quadrupole filter 3 is larger as their initial kinetic energy is larger, the time necessary to pass through the quadrupole filter 3 is shorter. In conventional mass spectrometers, the time $t_1$ of FIG. 3B is constant irrespective of the scanning speed. In the mass spectrometer of the present embodiment, on the other hand, the time $t_1$ becomes shorter as the scanning speed is increased. This leads to the effect that the voltage change ΔV within the passing time $t_1$ is small even though the scanning speed is large. As a result of this, the ions are negligibly influenced by the voltage change before they enter the ion detector 4.

Figure 4:
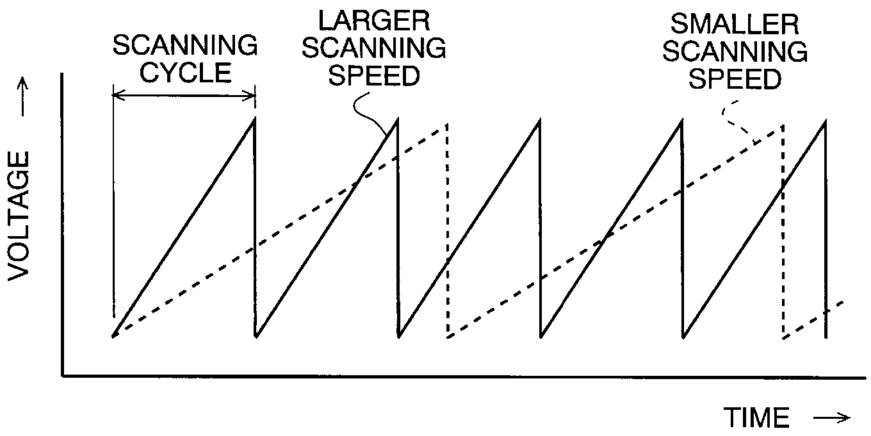
FIG. 4 is a graph of the voltage change in a low-speed scanning and in a high-speed scanning.

When the scanning of a mass analysis is started, the controller 5 provides the quadrupole driver 7 with a command that generates such a voltage that ions having the smallest mass number $m_1$ in the set mass range can pass through the quadrupole filter 31. To the lens unit driver 8, the controller 5 sends a command to generate a certain DC voltage. The DC voltage of the lens unit driver 8 may be determined so that the number of ions arriving at the ion detector 4 becomes maximum. Then the controller 5 controls the quadrupole driver 7 so that the mass number of ions passing through the quadrupole filter 3 gradually increases from the initial mass number $m_1$. Examples of the DC voltages generated by the quadrupole driver 7 are shown in FIG. 4. The RF voltage also changes according to the DC voltage. As mentioned before, the larger the scanning speed is, the larger the kinetic energy of the ions when they enter the quadrupole filter 3 because the voltage difference between the ion source 1 and the rod electrodes 31–34 is made larger as the scanning speed is large. Thus a larger number of ions can pass through the quadrupole filter 3 and enter the ion detector 4, which leads a higher sensitivity of the mass analysis.

It should be noted that the moving speed of ions is lower as their mass number is larger, so that heavier ions may bear larger influence of the voltage change ΔV. Then, for example, in determining the rod bias voltage according to the scanning speed, it is preferable to set up voltage more highly when the maximum mass number of the scanning range is large. That is, in FIG. 2, the curve is preferably shifted to the left when the maximum mass number is large.

In the above description, the rod bias voltage is changed while the voltage on the ion source box 11 is fixed. It is of course possible to change the voltage on the ion source box 11 while the rod bias voltage is fixed, or to change both voltages simultaneously. It is also obvious that the same effect can be obtained when negative ions, as contrasted to the positive ions described above, are generated in the ion source box 11.

What is claimed is:

1. A quadrupole mass spectrometer comprising:

an ion source;

a quadrupole filter including four rod electrodes for allowing ions having a preset mass number among ions generated by the ion source to pass through a space surrounded by the four rod electrodes;

an ion detector for detecting the ions passing through the space;

a quadrupole driver for applying a voltage corresponding to the preset mass number to the four rod electrodes;

a scanning controller for changing the voltage applied to the four rod electrodes to scan through a scanning range of the mass number; and a field controller for producing an electrical field between the ion source and the quadrupole filter where the magnitude of the electrical field depends on a scanning speed of the scanning controller.

2. The quadrupole mass spectrometer according to claim 1, wherein the field controller is a bias controller for producing a DC voltage difference between the ion source and the quadrupole filter, where the magnitude of the DC voltage difference depends on the scanning speed.

3. The quadrupole mass spectrometer according to claim 2, wherein the bias controller applies a DC bias voltage to the four rod electrodes of the quadrupole filter so that the value of the DC bias voltage depends on the scanning speed.

4. The quadrupole mass spectrometer according to claim 1, wherein the magnitude of the electrical field is not changed while the scanning speed is smaller than a preset value, and is changed when the scanning speed is larger than the preset value.

5. The quadrupole mass spectrometer according to claim 1, wherein the magnitude of the electrical field is made larger as the scanning range is shifted to a larger mass number.

6. The quadrupole mass spectrometer according to claim 2, wherein the magnitude of the DC voltage difference is made larger as the scanning range is shifted to a larger mass number.

7. The quadrupole mass spectrometer according to claim 3, wherein the magnitude of the DC bias voltage applied to the four rod electrodes is made larger as the scanning range is shifted to a larger mass number.

* * * * *